US012652295B2

(12) United States Patent
Turkulainen et al.

(10) Patent No.: US 12,652,295 B2
(45) Date of Patent: Jun. 9, 2026

(54) ARRANGEMENT AND A METHOD OF THREAT DETECTION IN A COMPUTING DEVICE OR A COMPUTER NETWORK

(71) Applicant: WithSecure Corporation, Helsinki (FI)

(72) Inventors: Jarkko Turkulainen, Helsinki (FI); Pavel Turbin, Helsinki (FI)

(73) Assignee: WITHSECURE CORPORATION, Helsinki (FI)

( * ) Notice: Subject to any disclaimer, the term of this patent is extended or adjusted under 35 U.S.C. 154(b) by 225 days.

(21) Appl. No.: 18/536,871

(22) Filed: Dec. 12, 2023

(65) Prior Publication Data

US 2024/0250962 A1    Jul. 25, 2024

(30) Foreign Application Priority Data

Jan. 23, 2023    (GB) ..................................... 2300944

(51) Int. Cl.
*H04L 9/40*    (2022.01)
(52) U.S. Cl.
CPC ...... *H04L 63/1416* (2013.01); *H04L 63/1441* (2013.01)
(58) Field of Classification Search
None
See application file for complete search history.

(56) References Cited

U.S. PATENT DOCUMENTS

| | | | | | |
|---|---|---|---|---|---|
| 8,590,045 | B2 * | 11/2013 | Niemela | ............... | G06F 21/566 |
| | | | | | 726/24 |
| 8,752,180 | B2 * | 6/2014 | Barile | ................... | G06F 21/566 |
| | | | | | 713/165 |
| 9,065,826 | B2 * | 6/2015 | Colvin | ................ | G06F 21/6218 |
| 9,183,383 | B1 * | 11/2015 | Yablokov | ................ | G06F 12/16 |

(Continued)

FOREIGN PATENT DOCUMENTS

| | | | | | |
|---|---|---|---|---|---|
| CA | 3053185 | A1 * | 8/2018 | ............. | G06Q 20/12 |
| CA | 2968201 | C * | 1/2021 | ......... | H04L 63/0236 |

(Continued)

OTHER PUBLICATIONS

Search Report for GB2300944.2 dated Jul. 21, 2023, 1 page.

*Primary Examiner* — Amir Mehrmanesh
*Assistant Examiner* — Hassan Saadoun
(74) *Attorney, Agent, or Firm* — NIXON & VANDERHYE

(57) ABSTRACT

A method of threat detection in a computing device or network includes determining that a financial related service is accessed with the computing device, determining during an active session or connection to the financial related service that an application of the computing device is requesting network access and checking the reputation of the application. Based thereon, blocking network access if the application or the process is not a trusted application or a trusted process, scanning memory of the computing device used by the application or the process for malicious or unusual content if the application is a trusted application or (Continued)

the process is a trusted process, and if scanning indicates no malicious or unusual content, granting network access to the application or the process, and if scanning of the application or the process indicates malicious or unusual content, blocking network access for the application or the process.

20 Claims, 4 Drawing Sheets

(56)                    References Cited

U.S. PATENT DOCUMENTS

| | | | |
|---|---|---|---|
| 9,495,538 B2 * | 11/2016 | Schneider | G06F 21/52 |
| 10,334,083 B2 * | 6/2019 | Katmor | H04L 63/0236 |
| 2009/0199297 A1 | 8/2009 | Jarrett et al. | |
| 2017/0329966 A1 * | 11/2017 | Koganti | G06F 21/56 |

FOREIGN PATENT DOCUMENTS

| | | | | | |
|---|---|---|---|---|---|
| EP | 3029593 A1 | 6/2016 | | | |
| EP | 2486507 B1 | 8/2016 | | | |
| WO | 2010138641 A1 | 12/2010 | | | |
| WO | WO-2020142412 A1 * | 7/2020 | | | H04L 9/50 |

* cited by examiner

ARRANGEMENT AND A METHOD OF THREAT DETECTION IN A COMPUTING DEVICE OR A COMPUTER NETWORK

CROSS-REFERENCE TO RELATED APPLICATIONS

This application claims the priority under 35 USC 119(a) of GB patent application 2300944.2 filed on 23 Jan. 2023, the entirety of which is incorporated herein by reference.

TECHNICAL FIELD

The present invention relates to an arrangement and a method of threat detection in a computing device or a computer network.

BACKGROUND

Malware detection and scanning is a vital issue for the security of any kind of endpoints and networks. Malware detection and scanning is generally directed to identify and potentially also disinfect any kind of malware on computer and/or communication systems, such as e.g. viruses, Trojans, worms, or other kinds of security threats.

Malware is a general term that refers to software designed to infect and/or damage a user's computer. An example type of malware is spyware that has been designed for illegal use. Such spyware records information entered by the user into a computer. The information is then forwarded by the spyware to an attacker. The attacker examines the recorded information to look for data such as the user's bank username and password that may have been entered by the user to access an online bank account. The attacker can then use the username and password to log onto the user's bank account and execute fraudulent transactions.

Spyware can also be used in combination with "phishing". Phishing involves an attacker sending messages to recipients, mainly in the form of e-mails, with the message claiming to be from a legitimate organization such as a bank. The message would typically request the recipient to provide their account details to the organization, either by replying to the e-mail or by clicking a hyperlink contained within the e-mail. In the latter example, the user will be directed to a fake website designed by the attacker to deceive the user into thinking it is a legitimate website. Any details that the user provides, either by e-mail or through the website, are stored by the attacker for use in fraudulent transactions. In order to increase the effectiveness of a phishing attack, the attacker may use spyware to collect user specific information and tailor a phishing email accordingly.

Spyware can be introduced onto a user's computer by means of a so-called "trojan". A trojan is a program that is installed unknowingly by a user, and which can carry spyware as its payload. The trojan disguises itself either as legitimate software or is downloaded and installed simultaneously with legitimate software. The trojan can also be sent as an e-mail attachment, for example being attached to a fake e-mail claiming to be from a bank so as to trick the user into installing the spyware. Once the spyware is installed it is designed to remain concealed and to monitor computer activity by, for example, performing keylogging, and on certain user actions to interfere with the functioning of the user's software. The data obtained by the spyware is sent to the attacker to analyze and recover sensitive details relating to the user, such as bank passwords and the like, so that the attacker can use the sensitive details to commit fraud.

Trojans specifically designed to enact financial fraud are known in the art as "banking trojans".

As well as introducing spyware, a banking trojan can install other types of malware which cause a user's web browser to be directed to an attacker's server even though the user enters a "trusted" web site address. The attacker's server operates as a middleman between the user's browser and the trusted server. Any data entered by the user is rerouted to the attacker's server and any information from the legitimate website can be edited before being displayed to the user. During the session the attacker's server can add or interfere with the user's transactions without the user knowing. An attack of this nature, where the attacker modifies data as it is being entered by the user, is known as a "Man-in-the-Middle" (MITM) attack.

Another form of rerouting attack used by banking trojans involves the malware rerouting traffic from a trusted web site to an attacker's server. This is known "Pharming" and involves the attacker's server presenting the user with a fake website which requests the user to enter their login details. The login details are stored by the server and the server informs the user that the website is down and asks the user to try again later. As the login requested by the user is not actually made, the collected login details remain "fresh".

Also some banking trojans have appeared which can introduce malware which does not need to capture actual data from the user, but rather only needs to capture the sessions in which the service transaction takes place. More specifically, the malware hooks into the web browser and no rerouting to an attacker's server is required. This type of malware is dangerous because it piggybacks on the valid authentication and authorization mechanisms and does not need to know any details of these. In addition, it can circumvent end-to-end security mechanisms such as Secure Socket Layer (SSL) and Transport Layer Security (TLS).

For these reasons it's important to prevent the malware to intercept banking sessions or other financial related services used by a user of a computer. The current known solutions are not able to recognize malware reliably in all situations. Therefore, it would be desirable to achieve more reliable malware detection which can be used during usage of financial services, such as banking services.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

According to a first aspect, the invention relates to a method, e.g. a computer implemented method, of threat detection in a computing device or a computer network, wherein the method comprises: determining that a financial related service is accessed with the computing device, determining during an active session or connection to the financial related service that an application or process of the computing device is requesting use of network access of the computing device, and checking the reputation of the application or process. Based on the checked reputation of the application or the process, blocking network access of the application or the process if the application or the process is not a trusted application or a trusted process and scanning memory of the computing device used by the application or the process for malicious or unusual content if the application is a trusted application or the process is a trusted process. If scanning indicates no malicious or unusual content, granting network access to the application or the process, and if scanning of the application or the process indicates malicious or unusual content, blocking network access for the application or the process.

In one embodiment of the invention network access for untrusted applications or processes and/or for scanned applications or processes indicating malicious or unusual content is restricted or denied at least as long as the financial related service is accessed.

In one embodiment of the invention only applications, processes and/or services belonging to operating system and/or infrastructure related processes are identified as trusted applications or processes when the computing device is connected to the financial related service.

In one embodiment of the invention scanning of the application or the process comprises detecting remote thread injections by the application or the process.

In one embodiment of the invention determination of thread injections by the application or the process is at least in part based on by recognizing that the application or process has different code execution memory protection and/or is not started or running from the loaded module of the application or the process.

In one embodiment of the invention scanning of the application or the process comprises comparison of in-memory sections with on disk executable sections.

In one embodiment of the invention scanning of the application or process comprises checking that resources loaded by the application or the process, such as loaded DLLs, are known and/or trusted.

In one embodiment of the invention checking that a financial related service is accessed with the computing device is at least partly based on a list of financial related services and/or network addresses of the financial related services, such as banking services.

In one embodiment of the invention the finance related service is a banking website or a banking service.

In one embodiment of the invention the unusual content comprises memory usage by the application, which is not according to predefined rules, e.g. traces of memory injections not according to predefined rules.

According to a second aspect, the invention relates to an arrangement for threat detection in a computing device or computer network, wherein the arrangement comprises at least one computing device, wherein the computing device is configured to determine that a financial related service is accessed with the computing device, to determine during an active session or connection to the financial related service that an application or process of the computing device is requesting use of network access of the computing device, and to check the reputation of the application or the process. Based on the checked reputation of the application or the process the computing device is configured to block network access of the application or the process if the application or process is not a trusted application or a trusted process, and to scan memory of the computing device used by the application for malicious content if the application is a trusted application or the process is a trusted process. If scanning indicates no malicious content, the computing device is configured to grant network access to the application, and if scanning of the application indicates malicious content to block network access for the application.

In one embodiment of the invention the arrangement is configured to carry out a method according to any embodiment.

According to a third aspect, the invention relates to a computer program comprising instructions which, when executed by a computing device, cause the computing device to carry out a method according to the invention.

According to a fourth aspect, the invention relates to a computer-readable medium comprising the computer program according to the invention.

With the solution of the invention it's possible to implement threat detection which provides improvements for recognizing and preventing malware, such as banking trojans, which can intercept online banking sessions or network sessions to other financial related services. The solution of the invention is able to reliably prevent e.g. a trojan to control traffic from the user browser and to stop them to interacting with the banking session to steal money.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF THE DRAWINGS

The embodiments of the invention are illustrated by way of example, and not by way of limitation, in the figures of the accompanying drawings.

DETAILED DESCRIPTION

Figure 1:
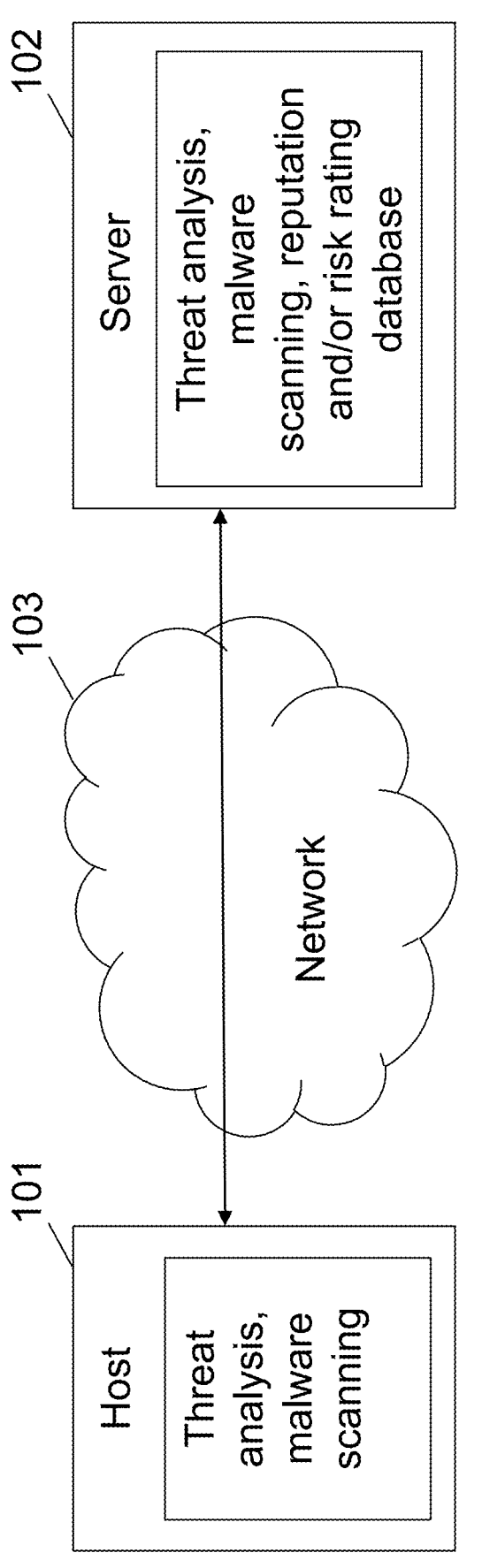
FIG. 1 presents as a schematic diagram a computer network configuration, for which exemplifying embodiments of the present invention are applicable.

FIG. 1 presents an environment in which the solution of the invention can be used. In the solution of FIG. 1 a system configuration is presented in which a host 101, e.g. a computing device, and a remote entity or server 102 are connected via a network 103. Here, the host 101 exemplifies any computing device, such as a computer or communication system, including a single device, a network node or a combination of devices, on which threat analysis is to be performed. The threat analysis can be done at the host and/or at the server. For example, the host 101 may include a personal computer, a personal communication device, a network-enabled device, a client, a firewall, a mail server, a proxy server, a database server, or the like. The server 102 exemplifies any computing device or communication system, including a single device, a network node or a combination of devices, on which threat analysis can be performed for the host 1, or which can provide data for the host 101 required to carry out the threat analysis at the host, such as reputation data. For example, the server 102 may include a security entity or a backend entity of a security provider, or the like, and the server 102 may be realized in a cloud implementation or the like.

According to exemplifying embodiments of the invention, threat analysis at the host 101 and/or by the server 102 can be realized using a threat analysis environment which can be arranged at the host and/or at the server. E.g a threat analysis agent, such as e.g. an anti-malware software can be installed/arranged at the host 101 to be used for threat analysis.

In one embodiment of the invention the threat analysis environment, service and/or software can detect starting and closing of applications, all unusual processes and attach monitoring to the required applications and processes. Also, when the services are started early, the service is able to detect and follow most of user's application. In one embodiment of the invention, when the malware scanning software or service is started up, it can perform running application inventory.

The network 103 exemplifies any computing device or communication network, including e.g. a (wired or wireless) local area network like LAN, WLAN, Ethernet, or the like, a (wired or wireless) wide area network like WiMAX, GSM, UMTS, LTE, or the like, and so on. Hence, the host 101 and the server 102 can but do not need to be located at different locations. For example, the network 103 may be any kind of TCP/IP-based network. Insofar, communication between the host 101 and the server 102 over the network 103 can be realized using for example any standard or proprietary protocol carried over TCP/IP, and in such protocol the malware scanning agent at the host 101 and the malware analysis sandbox or application at the server 102 can be represented on/as the application layer.

Figures 2, 3:
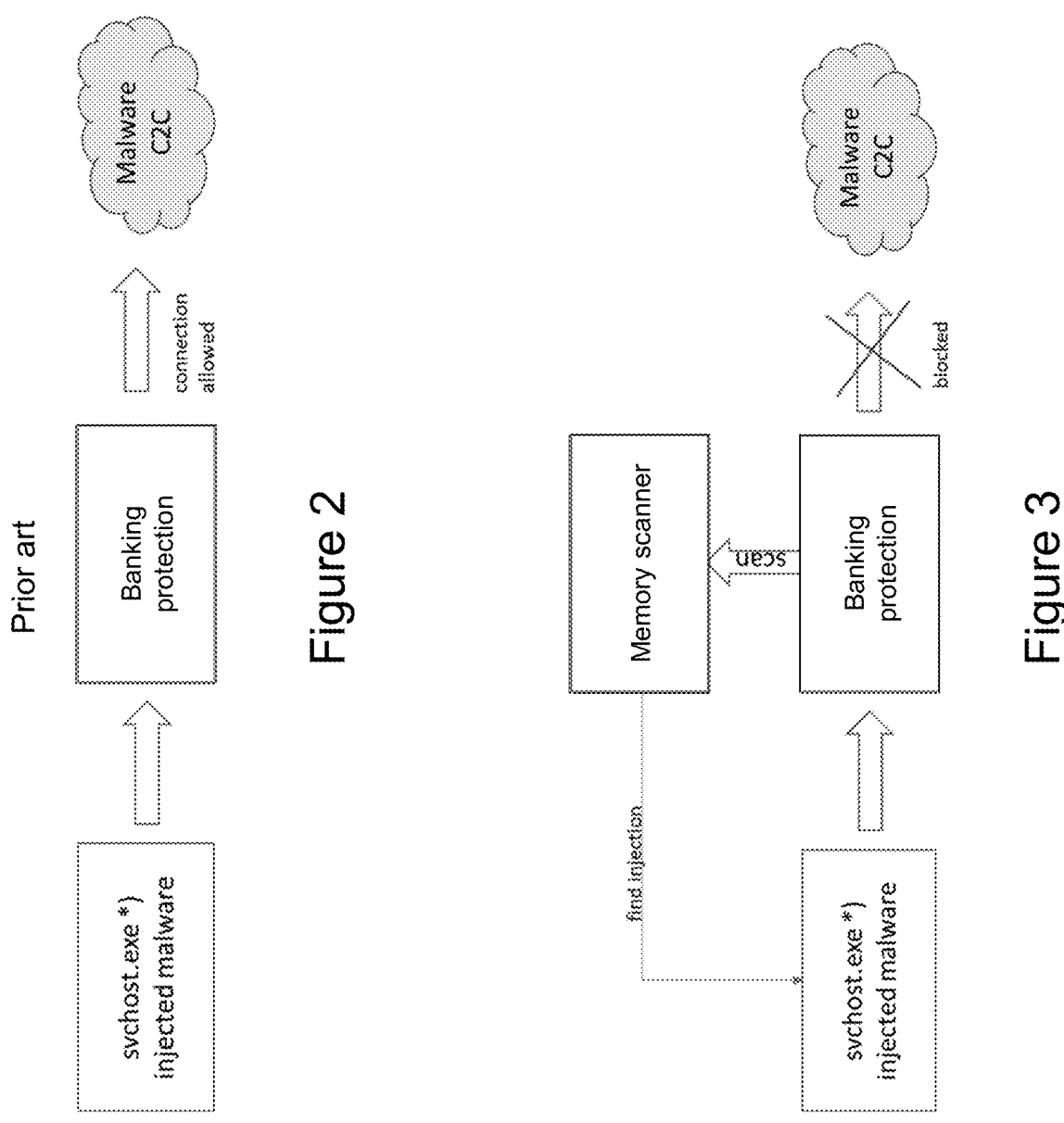
FIG. 2 presents schematically an example of how a prior art banking protection operates.
FIG. 3 presents an example embodiment of the solution of the invention.

FIG. 2 presents schematically an example how a prior art banking protection operates. In the prior art solutions, a common way to decide about allow or deny option for an application during a banking session at the computing device is to check the trust of the executable running the process. If the executable comes from well-known sources like be part of operating system, signed by trusted vender or was analysed to be safe in some other way, the service running from the executable gets the allow network decision also during a banking session.

However, malware can commonly utilize different techniques to hide self and stay under radar. One of approaches is to run its code under host of another application, e.g. some known clean application, for example, explorer.exe. Malware launcher can in this case write its executable payload as byte code into memory of another application and schedules a thread to run under the application.

For example, DNS service is implemented as svchost.exe process started from Windows folder. This svchost.exe file is signed, and it is part of OS, hence, it is known as safe. Since this service performs DNS management, the network operations must be allowed to support the online connectivity during the banking session. This assumption makes a weak point in the banking protection of the prior art. While process image could be known clean as executable file but in run time malware could modify its memory. As described above, the trojans can use the clean images to host the payload. Malware could inject the payload as remote thread into running process, run process from clean image but override mapped memory containing executable sections or load own malicious DLL into a clean process. This can't be recognized in the solution of the prior art according to FIG. 2.

The above situation can be improved with the solution of the invention. The solution of the invention can be provided as part of anti-malware solution and/or threat analysis solution. It can be implemented e.g. as an end point network firewall.

In the solution of the invention it is determined that a financial related service is accessed with the computing device. In one embodiment of the invention checking that a financial related service is accessed with the computing device is at least partly based on a list of financial related services and/or network addresses of the financial related services, such as banking services. In one embodiment of the invention the finance related service is a banking website or a banking service.

During an active session or connection to the financial related service it can be determined that an application or process of the computing device is requesting use of network access of the computing device. Based on this reputation of the application or process is checked. Reputation of an application or a process can comprise information relating to the application or process as being a trusted or an untrusted application or process. The reputation can be queried from a reputation service and/or a reputation database.

If the application or the process is not a trusted application or a trusted process based on the checked reputation of the application or the process, network access of the application or the process blocked.

If the application is a trusted application or the process is a trusted process, memory of the computing device used by the application, or the process is scanned for malicious or unusual content. If the scanning indicates no malicious or unusual content, network access can be granted to the application or the process, and if the scanning of the application or the process indicates malicious or unusual content, network access is blocked for the application or the process.

The unusual content can comprise in the context of the invention e.g. thread injections into process space from another process. These can comprise e.g. remote thread created into the process, allocated or modified memory areas in the process from other process, tricking the process to load a DLL which it would not load by its normal operation logic (such as in DLL side loading), not listing loaded DLL(s) process in load module (so normal tooling examining process image doesn't find the DLL).

In one embodiment of the invention network access for untrusted applications or processes and/or for scanned applications or processes indicating malicious or unusual content can be restricted or denied at least as long as the financial related service is accessed.

In one embodiment of the invention, the unusual content can comprise memory usage by the application, which is not according to predefined rules, e.g. traces of memory injections not according to predefined rules. In one embodiment of the invention, the unusual content can comprise any activity by the application or the process which is not considered as allowed in the threat detection system.

In one embodiment of the invention only applications, processes and/or services belonging to operating system and/or infrastructure related processes are identified as trusted applications or processes when the computing device is connected to the financial related service.

In one embodiment of the invention scanning of the application or the process comprises detecting remote thread injections by the application or the process. In one embodiment of the invention determination of thread injections by the application or the process is at least in part based on by recognizing that the application or process has different code execution memory protection and/or is not started or running from the loaded module of the application or the process. Scanning of the application or the process can comprise comparison of in-memory sections with on disk executable sections and/or checking that resources loaded by the application or the process, such as loaded DLLs, are known and/or trusted. Scanning may be performed on one or more of: a system memory; driver memory; a kernel memory. In one embodiment of the invention the unusual content can comprise memory usage by the application, which is not according to predefined rules, e.g. traces of memory injections not according to predefined rules.

With the solution of the invention, when user e.g. enters a banking site, the solution of the invention can restrict network access for an untrusted application. In one embodiment of the invention only applications and services belonging to operating system or infrastructure related processes are allowed to connect the Internet when a financial related service is accessed. For instance, under the banking session the solution of one embodiment of the invention would allow networking for DNS/DHCP system services and block a video player. Such restriction can break the trojan and thus user can perform secure banking session.

In one embodiment of the invention the financial related services may comprise at least one of the following: a banking application, a banking website, an internet banking website, a payment service, a website comprising payment functionality, an e-commerce service, an e-commerce site.

FIG. 3 presents one example scenario which can be handled by the at least some embodiments of the solution of the invention.

In the example scenario of FIG. 3 the solution of the invention detects that an application or process is requesting network connection during a session to a financial related service, such as a banking site or service is active at the computing device. Based on detection it's checked if the application or process is started from a known clean image. If yes, the memory of the application or process is scanned. Based on scanning, thread injections can be detected. All started threads have usual code execution memory protection and are started from the loaded modules as remote threads may change memory protections and are not running from loaded modules. Thus e.g. in-memory and on disk executable sections can be compared and/or it can be checked that loaded DLLs are known and trusted, for example signed. If in the scanning the required conditions are not met, the network connection is blocked and/or handled as process image or application would not be trusted.

The solution presented in FIG. 3 provides good efficiency in the blocking malware. It should also have very low false positive rate because operating system modules don't commonly include dynamic code.

When malicious content is detected, these applications and processes can be blocked and eliminated from the computing device. Sometimes it can't be reliably determined in all cases if an application is malicious or not, and in these uncertain cases, the application or processes can't be terminated. Instead, traces of un-usual memory injections can be searched. These may belong to legit application but in one embodiment of the invention network access of such applications or processes can be restricted as long as the computing device is accessing a financial related service as the applications or processes may be also malicious. This way it can be ensured that malicious applications or processes can't interfere the banking session.

Figure 4:
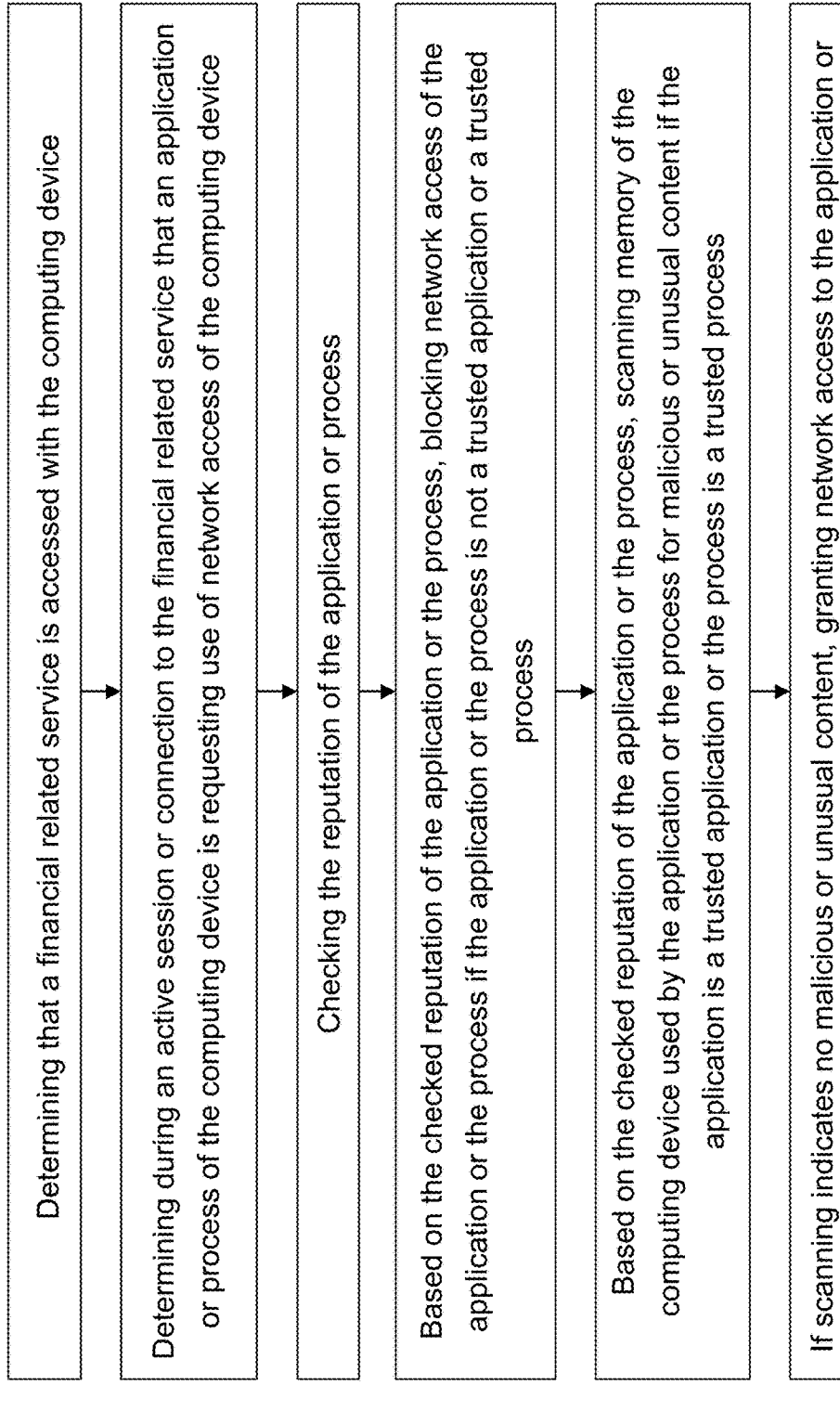
FIG. 4 presents an example method according to one embodiment of the invention.

FIG. 4 presents an example method according to one embodiment of the invention. In the method it's determined that a financial related service is accessed with the computing device. It's further determined during an active session or connection to the financial related service that an application or process of the computing device is requesting use of network access of the computing device. In the method the reputation of the application or process is checked. Based on the checked reputation of the application or the process network access of the application or the process is blocked if the application or the process is not a trusted application or a trusted process. If the application is a trusted application or the process is a trusted process memory of the computing device used by the application or the process is scanned for malicious and/or unusual content. If the scanning indicates no malicious and/or unusual content, network access is granted to the application or the process, and if the scanning of the application or the process indicates malicious and/or unusual content, network access for the application or the process is blocked.

Figure 5:
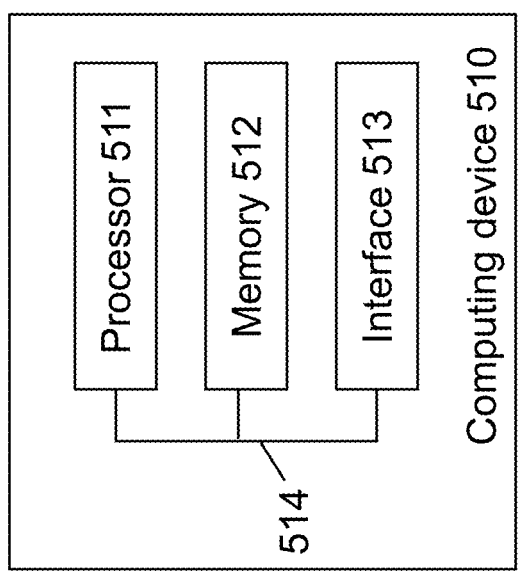
FIG. 5 presents as a schematic diagram an example of a structure of an arrangement according to exemplifying embodiments of the present invention.

As presented in FIG. 5, a computing device 510 or at least part of the computing device, e.g. an endpoint and/or a server, according to exemplifying embodiments of the present invention may comprise at least one processor 511 and at least one memory 512 (and possibly also at least one interface 513), which may be operationally connected or coupled, for example by a bus 514 or the like, respectively.

The processor 511 of the computing device 510 is configured to read and execute computer program code stored in the memory 512. The processor may be represented by a CPU (Central Processing Unit), a MPU (Micro Processor Unit), etc., or a combination thereof. The memory 512 of the computing device 510 is configured to store computer program code, such as respective programs, computer/processor-executable instructions, macros or applets, etc. or parts of them. Such computer program code, when executed by the processor 511, enables the computing device 510 to operate in accordance with exemplifying embodiments of the present invention. The memory 512 may be represented by a RAM (Random Access Memory), a ROM (Read Only Memory), a hard disk, a secondary storage device, etc., or a combination of two or more of these. The interface 513 of the computing device 510 is configured to interface with another computing device and/or the user of the computing device 510. That is, the interface 513 may represent a communication interface (including e.g. a modem, an antenna, a transmitter, a receiver, a transceiver, or the like) and/or a user interface (such as a display, touch screen, keyboard, mouse, signal light, loudspeaker, or the like).

The computing device 510 may, for example, represent a (part of a) first node, such as host 101 in FIG. 1, or may represent a (part of a) second node, such as remote entity or server 102 in FIG. 1. The computing device 510 may be configured to perform a procedure and/or exhibit a functionality as described in any one of FIGS. 3 to 4.

According to exemplifying embodiments of the present invention, the electronic file which creates processes and/or threads can be any electronic file, particularly encompassing any electronic file including a runnable/executable part, such as any kind of application file. Insofar, exemplifying embodiments of the present invention are applicable to any such electronic file, including for example a file of an Android Application Package (APK), a Portable Executable (PE), a Microsoft Soft Installer (MSI) or any other format capable of distributing and/or installing application software or middleware on a computer.

The data collected with the solution of the invention may be stored in a database or similar model for information storage for further use.

In an embodiment, an action may be taken to secure the computing device or the computer network when a malicious file, application or activity has been detected. Also, actions by changing the settings of the computing devices or other network nodes can be done. Changing the settings may include, for example, one or more nodes (which may be computers or other devices) being prevented from being switched off in order to preserve information in RAM, a firewall may be switched on at one or more nodes to cut off the attacker immediately, network connectivity of one or more of the network nodes may be slowed down or blocked, suspicious files may be removed or placed into quarantine, logs may be collected from network nodes, sets of command may be executed on network nodes, users of the one or more nodes may be warned that a threat or anomaly has been detected and that their workstation is under investigation, and/or a system update or software patch may be sent from the security backend to the nodes. In one embodiment of the invention one or more of these actions may be initiated automatically.

Although the invention has been described in terms of preferred embodiments as set forth above, it should be understood that these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein. Lists and groups of examples provided in the description given above are not exhaustive unless otherwise explicitly stated.

The invention claimed is:

1. A method of threat detection in a computing device or a computer network, wherein the method comprises:
   determining that a financial related service is accessed with the computing device,
   determining during an active session or connection to the financial related service that an application or process of the computing device is requesting use of network access of the computing device,
   checking the reputation of the application or process and based on the checked reputation of the application or the process:
   blocking network access of the application or the process if the application or the process is not a trusted application or a trusted process,
   scanning memory of the computing device used by the application or the process for malicious or unusual content if the application is a trusted application or the process is a trusted process, and
   if scanning indicates no malicious or unusual content, granting network access to the application or the process, and
   if scanning of the application or the process indicates malicious or unusual content, blocking network access for the application or the process.

2. The method according to claim 1, wherein in the method network access for untrusted applications or processes and/or for scanned applications or processes indicating malicious or unusual content is restricted or denied at least as long as the financial related service is accessed.

3. The method according to claim 1, wherein only applications, processes and/or services belonging to operating system and/or infrastructure related processes are identified as trusted applications or processes when the computing device is connected to the financial related service.

4. The method according to claim 1, wherein scanning of the application or the process comprises detecting remote thread injections by the application or the process.

5. The method according to claim 1, wherein determination of thread injections by the application or the process is at least in part based on by recognizing that the application or process has different code execution memory protection and/or is not started or running from the loaded module of the application or the process.

6. The method according to claim 1, wherein scanning of the application or the process comprises comparison of in-memory and on disk executable sections.

7. The method according to claim 1, wherein scanning of the application or process comprises checking that resources loaded by the application or the process are known and/or trusted.

8. The method according to claim 1, wherein checking that a financial related service is accessed with the computing device is at least partly based on a list of financial related services and/or network addresses of the financial related services.

9. The method according to claim 1, wherein the finance related service is a banking website or a banking service.

10. The method according to claim 1, wherein the unusual content comprises memory usage by the application, which is not according to predefined rules.

11. An arrangement for threat detection in a computer or computer network, wherein the arrangement comprises at least one computing device, wherein the computing device is configured:
   to determine that a financial related service is accessed with the computing device,
   to determine during an active session or connection to the financial related service that an application or process of the computing device is requesting use of network access of the computing device,
   to check the reputation of the application or the process and based on the checked reputation of the application or the process:
   to block network access of the application or the process if the application or process is not a trusted application or a trusted process,
   to scan memory of the computing device used by the application for malicious or unusual content if the application is a trusted application or the process is a trusted process, and
   if scanning indicates no malicious or unusual content, to grant network access to the application, and
   if scanning of the application indicates malicious or unusual content to block network access for the application.

12. The arrangement according to claim 11,
   wherein network access for untrusted applications or processes and/or for scanned applications or processes indicating malicious or unusual content is restricted or denied at least as long as the financial related service is accessed.

13. A non-transitory computer-readable medium on which is stored a computer program comprising instructions which, when executed by a computer, cause the computer to carry out a method of threat detection in a computing device or a computer network, wherein the method comprises:

determining that a financial related service is accessed with the computing device, determining during an active session or connection to the financial related service that an application or process of the computing device is requesting use of network access of the computing device, checking the reputation of the application or process and based on the checked reputation of the application or the process:

blocking network access of the application or the process if the application or the process is not a trusted application or a trusted process, scanning memory of the computing device used by the application or the process for malicious or unusual content if the application is a trusted application or the process is a trusted process, and if scanning indicates no malicious or unusual content, granting network access to the application or the process, and if scanning of the application or the process indicates malicious or unusual content, blocking network access for the application or the process.

14. The method according to claim 2, wherein only applications, processes and/or services belonging to operating system and/or infrastructure related processes are identified as trusted applications or processes when the computing device is connected to the financial related service.

15. The method according to claim 14, wherein scanning of the application or the process comprises detecting remote thread injections by the application or the process.

16. The method according to claim 15, wherein determination of thread injections by the application or the process is at least in part based on by recognizing that the application or process has different code execution memory protection and/or is not started or running from the loaded module of the application or the process.

17. The method according to claim 16, wherein scanning of the application or the process comprises comparison of in-memory and on disk executable sections.

18. The method according to claim 17, wherein scanning of the application or process comprises checking that resources loaded by the application or the process are known and/or trusted.

19. The method according to claim 18, wherein checking that a financial related service is accessed with the computing device is at least partly based on a list of financial related services and/or network addresses of the financial related services.

20. The method according to claim 19, wherein the finance related service is a banking website or a banking service.

* * * * *